(12) United States Patent
Petillo et al.

(10) Patent No.: US 7,691,527 B2
(45) Date of Patent: Apr. 6, 2010

(54) METHOD AND APPARATUS FOR GENERATING HYDROGEN

(76) Inventors: Phillip J. Petillo, 1206 Herbert Ave., Ocean, NJ (US) 07712; Stephen C. Petillo, 1206 Herbert Ave., Ocean, NJ (US) 07712

( * ) Notice: Subject to any disclaimer, the term of this patent is extended or adjusted under 35 U.S.C. 154(b) by 317 days.

(21) Appl. No.: 10/421,653

(22) Filed: Apr. 22, 2003

(65) Prior Publication Data

US 2004/0009392 A1 Jan. 15, 2004

Related U.S. Application Data

(60) Provisional application No. 60/375,140, filed on Apr. 24, 2002.

(51) Int. Cl.
  *H01M 14/00* (2006.01)
  *C25B 9/00* (2006.01)
(52) U.S. Cl. .................... 429/122; 204/248
(58) Field of Classification Search ............... 429/122, 429/218.1, 19, 21, 34, 17, 27; 204/248
See application file for complete search history.

(56) References Cited

U.S. PATENT DOCUMENTS

| | | | |
|---|---|---|---|
| 2,534,533 A | 12/1950 | Schlesinger et al. ............ 23/14 |
| 3,210,157 A | 10/1965 | Lewis, Jr. et al. ............. 23/211 |
| 3,256,504 A | 6/1966 | Fidelman ................... 204/248 |
| 3,518,462 A | 6/1970 | Brown ........................ 310/10 |
| 3,892,653 A * | 7/1975 | Pacheco ..................... 204/238 |
| 3,933,676 A * | 1/1976 | Wade ...................... 252/188.26 |
| 3,942,511 A | 3/1976 | Black et al. ................. 126/248 |
| 4,264,362 A | 4/1981 | Sergev et al. ................. 75/243 |
| 4,325,798 A | 4/1982 | Mack ........................ 204/248 |
| 4,613,304 A | 9/1986 | Meyer ....................... 431/354 |
| 5,089,107 A | 2/1992 | Pacheco ..................... 204/248 |
| 5,242,565 A | 9/1993 | Winsel ....................... 204/265 |
| 5,804,329 A | 9/1998 | Amendola .................... 429/34 |
| 6,468,694 B1 * | 10/2002 | Amendola ............... 429/218.1 |
| 6,478,936 B1 * | 11/2002 | Volodarsky et al. ....... 204/286.1 |
| 6,497,973 B1 | 12/2002 | Amendola .................... 429/19 |
| 6,534,033 B1 | 3/2003 | Amendola et al. ........ 423/648.1 |
| 6,544,400 B2 * | 4/2003 | Hockaday et al. ............ 205/338 |
| 6,544,679 B1 | 4/2003 | Petillo et al. ................. 429/34 |
| 6,554,877 B2 | 4/2003 | Finkelshtain et al. .......... 44/436 |
| 6,562,497 B2 | 5/2003 | Finkelshtain et al. .......... 429/15 |

(Continued)

FOREIGN PATENT DOCUMENTS

JP 2001-253702 * 9/2001

(Continued)

OTHER PUBLICATIONS

"Sodium Borohydride, An Interesting Anodic Fuel (1)" by M. E. Indig and R. N. Snyder in J. of the Electrochemical Society, Nov. 1962, pp. 1104-1106.

*Primary Examiner*—Dah-Wei Yuan
*Assistant Examiner*—Angela J. Martin
(74) *Attorney, Agent, or Firm*—Michael B. Einschlag

(57) ABSTRACT

One embodiment of the present invention is a hydrogen generator that includes: (a) an anode material; (b) a cathode material; and (c) an electrolyte; wherein the electrolyte comprises a metal hydride, at least one stabilizing agent, and a solvent; and wherein hydrogen gas is generated whenever the anode material and the cathode material are electrically connected.

40 Claims, 5 Drawing Sheets

U.S. PATENT DOCUMENTS

| | | | |
|---|---|---|---|
| 6,737,184 B2 * | 5/2004 | Rusta-Sellehy et al. | 429/17 |
| 6,745,744 B2 * | 6/2004 | Suckewer et al. | 123/297 |
| 6,770,186 B2 * | 8/2004 | Rosenfeld et al. | 205/343 |
| 6,866,835 B1 * | 3/2005 | Stephenson | 423/657 |
| 7,045,230 B2 * | 5/2006 | Rusta-Sellehy et al. | 429/17 |
| 2002/0083643 A1 | 7/2002 | Amendola et al. | 48/61 |
| 2003/0009942 A1 * | 1/2003 | Amendola et al. | 48/61 |
| 2003/0037487 A1 | 2/2003 | Amendola et al. | 48/61 |

FOREIGN PATENT DOCUMENTS

RU 1794887 A1 * 2/1993

* cited by examiner

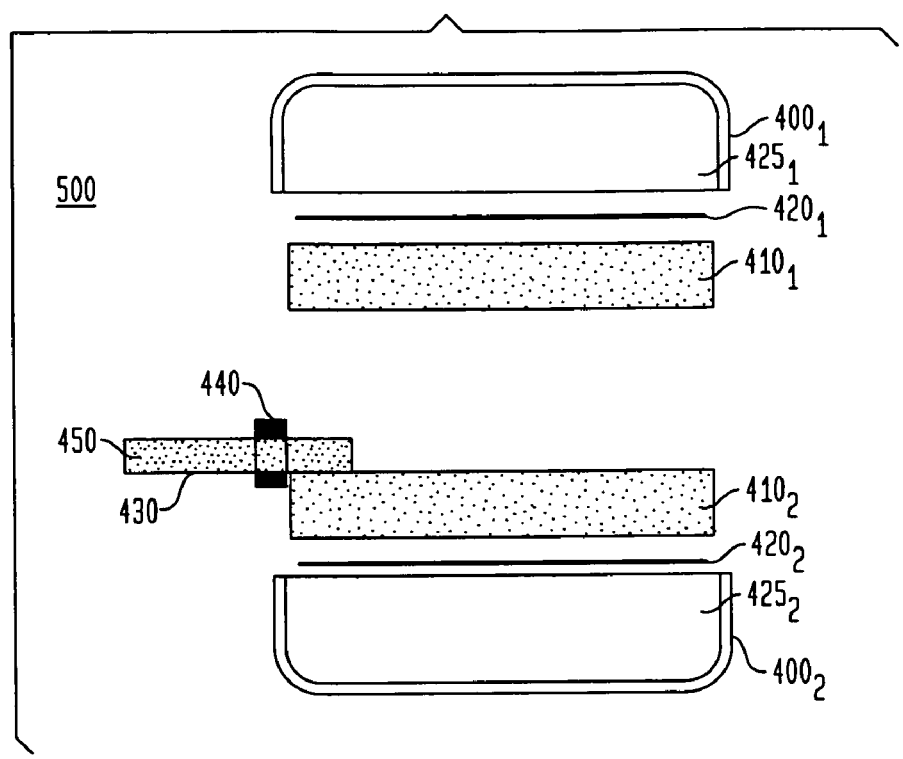
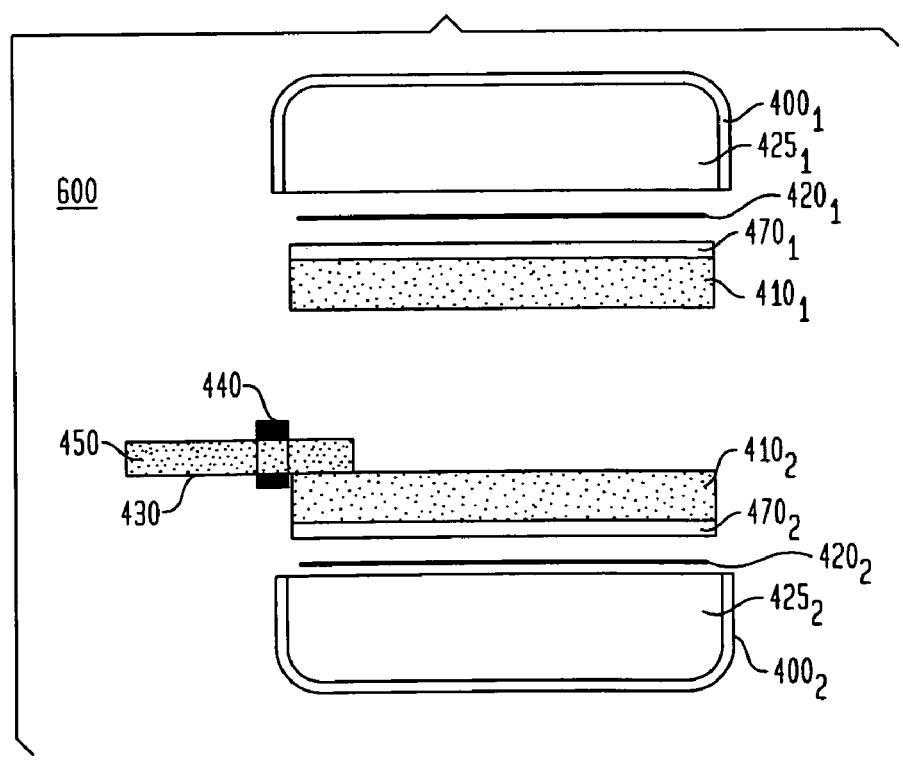

METHOD AND APPARATUS FOR GENERATING HYDROGEN

This application claims the benefit of U.S. Provisional Application No. 60/375,140, filed on Apr. 24, 2002, which application is incorporated herein by reference.

TECHNICAL FIELD OF THE INVENTION

One or more embodiments of the present invention pertain to method and apparatus for generating hydrogen.

BACKGROUND OF THE INVENTION

Hydrogen is a "clean fuel" because it can be reacted with oxygen in hydrogen-consuming devices, such as a fuel cell or combustion engine, to produce energy and water. Virtually no other reaction byproducts are produced in the exhaust. As a result, the use of hydrogen as a fuel may solve many environmental problems associated with the use of petroleum based fuels. Safe and efficient storage of hydrogen gas is important for many applications that use hydrogen. In particular, minimizing the volume and weight of hydrogen storage systems is important in mobile applications.

Several methods of storing hydrogen currently exist but are either inadequate or impractical for consumer applications. For example, hydrogen can be stored in liquid form at very low temperature or hydrogen can be stored under high pressure in cylinders, however, both of such storage methods are not practical for most consumer applications for a number of well known reasons related, for example, to safety and economics. Other methods of hydrogen storage include the use of chemical compounds that either: (a) chemically react with water or other species to generate hydrogen; or (b) reversibly adsorb and then release hydrogen. However, these methods are also not practical for most consumer applications for a number of well known reasons related, for example, to safety and economics.

Lastly, U.S. Pat. No. 6,534,033 issued Mar. 18, 2003 discloses a hydrogen generation system that includes a stabilized metal hydride solution and a hydrogen generation catalyst system which includes a supported hydrogen generation catalyst having molecules of a hydrogen generation catalyst bound to, entrapped within, and/or coated onto a substrate. In one disclosed system, mechanical pumps pump a sodium borohydride solution through a catalyst chamber containing precious metal catalysts. One disadvantage of such a system is that mechanical pumps are not only unreliable and heavy, but tend to leak and/or clog in the presence of the highly caustic solutions used. This reduces the reliability of the device. In addition, precious metal catalysts tend to wash out of the catalyst chamber due to the abrasive nature of the solution. This loss of precious metal catalyst is not only expensive but also results in seriously reduced catalytic activity and reduced hydrogen output. In further addition, the catalyst chamber must be periodically replaced.

In light of the above, there is a need in the art for method and apparatus for generating hydrogen that solves one or more of the above-identified problems.

SUMMARY OF THE INVENTION

One or more embodiments of the present invention satisfy one or more of the above-identified problems in the art. In particular, one embodiment of the present invention is a hydrogen generator system that comprises: (a) an anode material; (b) a cathode material; and (c) an electrolyte; wherein the electrolyte comprises a metal hydride, at least one stabilizing agent, and a solvent; and wherein hydrogen gas is generated whenever the anode material and the cathode material are electrically connected.

BRIEF DESCRIPTION OF THE DRAWING

FIG. 3 shows an exploded cross sectional view of a further hydrogen generator that is fabricated in accordance with one or more embodiments of the present invention;

FIG. 4 shows an exploded cross sectional view of a further hydrogen generator that is fabricated in accordance with one or more embodiments of the present invention;

DETAILED DESCRIPTION

Figure 1:
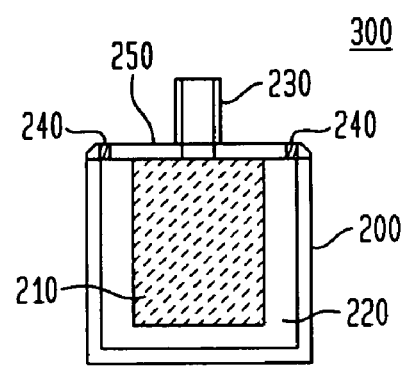
FIG. 1 shows a cross sectional view of a hydrogen generator that is fabricated in accordance with one or more embodiments of the present invention.

FIG. 1 shows hydrogen generator 300 that is fabricated in accordance with one or more embodiments of the present invention. Advantageously in accordance with one or more such embodiments of the present invention, hydrogen generator 300 may be fabricated in sizes comparable to those of commercially available button cell batteries, for example and without limitation, an "A" cell battery, an "AAA" cell battery, a "D" cell battery, and so forth depending on the amount of hydrogen gas required for a particular application.

As shown in FIG. 1, hydrogen generator 300 includes container 200. In accordance with one or more embodiments of the present invention, container 200 may be fabricated from a cathode material (embodied as described in detail below) or it may be fabricated form a further material that is coated, plated, and so forth with the cathode material (which coating, plating, and so forth is disposed on the inside of container 200, i.e., facing region 220). In accordance with one or more such embodiments, the further material may be, for example and without limitation, a non-conductive plastic, a metal, a conductive plastic, a ceramic, stone, fiberglass, and so forth (as a specific example, container 200 could be steel which is chrome-plated on the inside). Thus, in accordance with one or more embodiments of the present invention, container 200 may be fabricated as a structure that: (a) has at least an inner cathode material portion wherein an electrical connection can be made to the inner cathode material portion (for example and without limitation, by fabricating a container wherein the entire container is electrically conductive); and (b) can withstand the chemistry and pressure generated by the reaction therewithin (to be described in detail below). In addition, and as one can readily appreciate, container 200 may be fabricated in any number of shapes and sizes.

As further shown in FIG. 1, hydrogen generator 300 includes core 210. In accordance with one or more embodiments of the present invention, core 210 is fabricated from an anode material (embodied as described in detail below). In addition, core 210 may be fabricated in any one of a number of forms such as, for example and without limitation, a porous anode material, a metal wool-like material, or plastic wool-like material coated with anode material, a plastic foam coated with anode material, a mesh of anode material, an anode material cloth, an "expanded" anode material, a woven anode material, a honeycomb sheet of anode material, a perforated sheet of anode material, a plastic plated with anode material, a sintered metal filter of anode material, a microporous sheet of anode material, a solid anode material, anode material in the form of beads, small balls, chunks, or wires enclosed in a filter mesh, and so forth (as a specific example, the anode material of core 210 could be, for example and without limitation, nickel).

As further shown in FIG. 1, hydrogen generator 300 includes region 220. In accordance with one or more embodiments of the present invention, at least a portion of region 220, as well as at least a portion of the region occupied by core 210, is filled with an electrolyte (embodied as described in detail below).

As further shown in FIG. 1, hydrogen generator 300 includes conduit 230 that provides a conduit for hydrogen gas generated therein to exit hydrogen generator 300. In accordance with one or more embodiments of the present invention, conduit 230 is affixed to cap 250 using any one of a number of methods that are well known to those of ordinary skill in the art such as, for example and without limitation, by a force fit, by a screw attachment mechanism, and so forth. In accordance with one or more embodiments of the present invention, conduit 230 is electrically conductive, and is electrically connected to core 210 using any one of a number of methods that are well known to those of ordinary skill in the art such as, for example and without limitation, by welding, or by using any one of a number of mechanisms that are well known to those of ordinary skill in the art that promote electrical connectivity. As such, conduit 230 may be fabricated from any one of a number of materials such as, for example and without limitation, a metal, a conductive ceramic, a metal plated ceramic, a conductive plastic, and so forth.

As further shown in FIG. 1, hydrogen generator 300 includes cap 250 and insulator 240. In accordance with one or more embodiments of the present invention, if cap 250 fabricated from an electrically conductive material, it is electrically separated from container 200 by insulator 240. In accordance with such embodiments, insulator 240 may be fabricated from, for example and without limitation, a plastic such as nylon, polyester, Teflon, polyethylene, and so forth. In addition, cap 250 may be fabricated from any one of a number of materials such as, for example and without limitation, a metal, a conductive ceramic, a conductive plastic, and so forth. Alternatively, cap 250 may be fabricated from an insulating material, and in such a case one may not need to use insulator 240. In accordance with one or more embodiments of the present invention, cap 250 is affixed to container 200 using any one of a number of methods that are well known to those of ordinary skill in the art such as, for example and without limitation, a crimping method like that which is well known to those of ordinary skill in the art to fabricate button cell batteries, by using threads and a screw mechanism, and so forth.

Figure 1A:
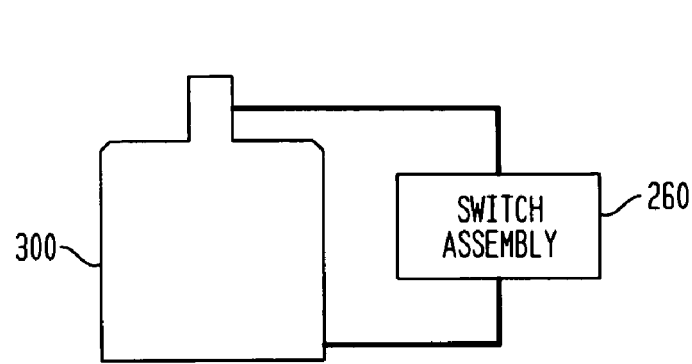
FIG. 1A shows the hydrogen generator of FIG. 1 with a switch assembly used to make an electrical connection between the anode material and cathode material in accordance with one or more embodiments of the present invention.

In accordance with one or more such embodiments of the present invention, a hydrogen generation reaction (to be described below) proceeds whenever the cathode material of container 200 is electrically connected to the anode material of core 210. For example and without limitation, conduit 220 can fit into a battery clip device (for example and without limitation, a battery clip device like any one or of number of commercially available devices) that is disposed, for example and without limitation, in a fuel cell (which fuel cell uses hydrogen generated in hydrogen generator 300) to provide an electrical connection between, for example, conduit 230 and container 200 (in such an embodiment, container 200 would be the negative terminal and conduit 220 would be the positive terminal). Alternatively, one could provide an electrical connection between conduit 230 and container 200 using any one of a number of electrical switches that are well known to those of ordinary skill in the art such as, for example and without limitation, manual switches, electrical switches, and so forth. Further alternatively, one could provide an electrical connection between conduit 230 and container 200 using a circuit that includes pressure sensor (embodied, for example and without limitation, using any one of a number of pressure switches that are well known to those of ordinary skill in the art) that senses the pressure of hydrogen gas and makes or breaks the electrical connection depending on predetermined values of hydrogen pressure in accordance with any one of a number of methods that are well known to those of ordinary skill in the art. The hydrogen pressure may be that of hydrogen that exits conduit 230 (in which case the pressure sensor would be disposed, for example, in conduit 230 to measure such pressure) or it may the pressure of hydrogen in a tank into which the hydrogen gas is stored (in which case the pressure sensor would be disposed, for example, in the tank to measure such pressure) prior to use in, for example and without limitation, a fuel cell. Further alternatively, one could provide an electrical connection between, for example, conduit 230 and container 200 using an SCR device (for example and without limitation, any one of a number of SCR devices that are well known to those of ordinary skill in the art) that senses the voltage generated when conduit 230 and container 200 are electrically connected and makes or breaks the electrical connection depending on predetermined values of voltage in accordance with any one of a number of methods that are well known to those of ordinary skill in the art. Further alternatively, one could provide an electrical connection between, for example, conduit 230 and container 200 using a microprocessor controlled electronic switch (for example and without limitation, any one of a number of microprocessor controlled electronic switches that are well known to those of ordinary skill in the art) to start and stop hydrogen generation by making or breaking the electrical connection based, for example and without limitation, on time or voltage level in accordance with any one of a number of methods that are well known to those of ordinary skill in the art. For example and without limitation, the microprocessor could determine the amount of time that the electrical connection has been made so the amount of hydrogen gas provided and/or remaining to be provided may be determined and reported using a display in accordance with any one of a number of methods that are well known to those of ordinary skill in the art. The determination of the amount of hydrogen gas provided and/or remaining to be provided may be determined either by calculation or by routine experimentation, and the results may be stored in the microprocessor. FIG. 1A shows hydrogen generator 300 of FIG. 1 with switch assembly 260 that is used to make an electrical connection between the anode material and cathode material in accordance with one or more embodiments of the present invention. As described above, switch assembly 260 may include a manual switch, a pressure switch, an SCR device, a microprocessor controlled electronic switch, and so forth.

It is believed that, whenever the anode material and the cathode material are electrically connected in the presence of an electrolyte, an oxidation-reduction potential is generated between the anode material and the cathode material. Further, it is believed that the oxidation-reduction potential enables: (a) an electro-galvanic hydrogen generation mechanism that causes hydrogen gas to be generated from an electrolyte that includes water; and (b) a chemical hydrogen generation mechanism that causes hydrogen gas to be generated from a chemical reaction among constituents of the electrolyte, both of which hydrogen generation mechanisms are regulated by the rate at which current is drawn by electrically connecting the anode material and the cathode material.

Electro-galvanic action is a well known phenomenon wherein, for example, a metal that is more reducing than hydrogen has the ability, when placed in water, to reduce protons in the water to hydrogen gas (in theory any material more negative in the electrochemical series than zero volts should have this ability). However, in practice, many materials that have negative voltages in the electrochemical series do not necessarily release hydrogen from water. One reason is that some metals become encased in an oxide coating that is not soluble in water, which oxide coating protects such metals from further oxidation. Metals such as aluminum, magnesium, titanium, chromium and nickel all have such oxide coatings. As a result, such metals tend to react better in acids or bases that dissolve the oxide coating and expose fresh metal to the water.

While any material with a voltage in the electrochemical series less than zero volts maybe used as an anode material to fabricate one or more embodiments of the present invention, the more negative the voltage, the faster hydrogen will be produced. Preferred metals have high negative voltages and low molecular weights, so that a reasonable weight percentage of hydrogen is obtained per weight of metal. Also, preferred are metals of higher density so that good volumetric densities are also obtained. Preferred metals include, all metals with voltages more negative than −0.75 Volts. Such metals include all metals in group 2 and 3, i.e., the lanthanide metals and actinide metals, and preferred metals are magnesium, aluminum, zinc, beryllium, titanium, vanadium, chromium, silicon, iron, nickel, and zirconium.

In accordance with one or more embodiments of the present invention, the active metal acts as an anode material. In this case, the reaction at an anode of the hydrogen generator is:

$$M + H_2O \rightarrow M(OH)_x + H_2 + xe^- \quad (1)$$

where M is the metal $$\text{Thus, for Mg: } Mg + 2H_2O \rightarrow Mg(OH)_2 + H_2 + 2e^- \quad (2)$$

$$\text{and for Zn: } Zn + 2H_2O \rightarrow Zn(OH)_2 + H_2 + 2e^- \quad (3)$$

It is believed that the external electrical connection between the anode material and the cathode material facilitates these exothermic reactions, which exothermic reactions are otherwise inhibited by an oxide coating on the metal. In addition, it is believed that the cathode material produces reduced species in the water (OH$^-$), which reduced species migrate back to the anode material and react with the anode material to complete the reaction as stated above. Thus, hydrogen generation can be turn on or off by making or breaking the electrical connection between the anode material and the cathode material.

It is believed that a corresponding reaction at a cathode of the hydrogen generator formed of an inert cathode material is:

$$H_2O + e^- \rightarrow \tfrac{1}{2} H_2 + OH^- \quad (4)$$

As one can readily appreciate from this, there is no need for the cathode to participate chemically. However, embodiments of the present invention exist wherein the cathode material is consumable. For example and without limitation, a consumable cathode material may be MnO$_2$. For such a cathode material, a reaction at the cathode of the hydrogen generator would be:

$$MnO_2 + 2e^- + 2H_2O \rightarrow Mn(OH)_2 + 2OH^- \quad (5)$$

As was described above, the OH$^-$ species will be attracted to the anode to maintain the charge balance from the loss of electrons, and the corresponding reaction at the anode of the hydrogen generator, for example and without limitation, would be:

$$Mg + 2H_2O \rightarrow Mg(OH)_2 + H_2 + 2e^- \quad (6)$$

It should be noted that the presence of a consumable cathode material may take up space that might be used for anodic material, thereby reducing the amount of hydrogen that can be produced from a given space.

In accordance with one or more embodiments of the present invention, the electrolyte includes a reducing compound (as in the case of a solution of a borohydride). It is believed that the oxidation-reduction potential generated between the anode material and the cathode material facilitates the release of hydrogen from the borohydride as well. In particular, it is believed that a chemical reaction occurs wherein the borohydride is oxidized by water to generate hydrogen. Such a chemical reaction wherein hydrogen gas (H$_2$) and borate (BO$_2^-$) are generated by reacting borohydride with water is represented as follows:

$$BH_4^- + 2H_2O \rightarrow BO_2^- + 4H_2 \quad (7)$$

The resulting borate is non-toxic and environmentally safe. In addition, borate can be regenerated into borohydride.

Hydride solutions useful in fabricating one or more embodiments of the present invention include a metal hydride. The term "solution," as used herein, includes a liquid in which all the components are dissolved and/or a slurry in which some of the components are dissolved and some of the components are undissolved solids. The term "about," as used herein, means plus or minus 10% of the stated value. Complex metal hydrides may also useful in fabricating one or more embodiments of the present invention. Such complex metal hydrides have a general chemical formula MBH$_4$. M is an alkali metal selected from Group 1 (formerly Group IA) of the periodic table, for example and without limitation, lithium, sodium or potassium—M may, in some cases, also be ammonium or organic groups; B is an element selected from group 13 (formerly Group IIIA) of the periodic table, for example and without limitation, boron, aluminum, and gallium; and H is hydrogen. Examples of metal hydrides useful in fabricating one or more embodiments of the present invention include, for example and without limitation, NaBH$_4$ (sodium borohydride), LiBH$_4$ (lithium borohydride), KBH$_4$ (potassium borohydride), NH$_4$BH$_4$ (ammonium borohydride), (CH$_3$)$_4$NH$_4$BH$_4$ (tetramethyl ammonium borohydride ((CH$_3$)$_4$NH$_4$BH$_4$), NaAlH$_4$, LiAlH$_4$, KAlH$_4$, NaGaH$_4$, LiGaH$_4$, KGaH$_4$, quaternary borohydrides, and mixtures thereof. It is believed that metal hydrides, especially borohydrides, are most stable in water, i.e., the metal hydrides do riot readily decompose when in contact with water.

In accordance with one or more embodiments of the present invention, stabilized metal hydride solutions useful in fabricating one or more embodiments of the present invention include: (i) a metal hydride, (ii) at least one stabilizing agent, and (iii) a solvent. In accordance with one or more such embodiments of the present invention, the metal hydride solution includes at least one stabilizing agent since aqueous borohydride solutions slowly decompose unless stabilized. A stabilizing agent, as used herein, is any component which retards, impedes, or prevents the reaction of metal hydride with water. Typically, effective stabilizing agents maintain metal hydride solutions at a room temperature (25° C.) pH of greater than about 7, preferably greater than about 11, more preferably greater than about 13, and most preferably greater than about 14.

Useful stabilizing agents include the corresponding hydroxide of the cation part of the metal hydride. For example, if sodium borohydride is used as the metal hydride, the corresponding stabilizing agent would be sodium hydroxide. Hydroxide concentrations in stabilized metal hydride solutions of the present invention are greater than about 0.1 molar, preferably greater than about 0.5 molar, and more preferably greater than about 1 molar or about 4% by weight. Typically, metal hydride solutions are stabilized by dissolving a hydroxide in water prior to adding the borohydride salt. Examples of useful hydroxide salts include, for example and without limitation, sodium hydroxide, lithium hydroxide, potassium hydroxide, and mixtures thereof. Sodium hydroxide is preferred because of its high solubility in water of about 44% by weight. Although other hydroxides are suitable, the solubility differences between various metal hydrides and various hydroxide salts must be taken into account since such solubility difference can be substantial. For example, adding too much lithium hydroxide to a concentrated solution of sodium borohydride would result in precipitation of lithium borohydride.

Other non-hydroxide stabilizing agents include those that can raise the over potential of the metal hydride solution to produce hydrogen. These non-hydroxide stabilizing agents may be used in combination with hydroxide salts. Non-limiting examples of non-hydroxide stabilizing agents include compounds containing the softer metals on the right side of the periodic chart. Non-limiting examples of these non-hydroxide stabilizing agents include compounds containing lead, tin, cadmium, zinc, gallium, mercury, and combinations thereof. Compounds containing gallium and zinc are preferred, because these compounds are stable and soluble in the basic medium. For example, zinc and gallium form soluble zincates and gallates, respectively, which are not readily reduced by borohydride.

Compounds containing some of the non-metals on the right side of the periodic chart are also useful in stabilizing metal hydride solutions. Non-limiting examples of these non-hydroxide stabilizing agents include compounds containing sulfur, such as sodium sulfide, thiourea, carbon disulfide, and mixtures thereof.

Since metal hydride solutions used to provide one or more embodiments of the present invention are stabilized, hydrogen will not be generated unless and until an electrical connection is made between the anode material and the cathode material. Further, upon removal of the electrical connection, no hydrogen generation occurs.

The reaction of a metal hydride with water (for example, as per of eqn. (7)) depends on temperature so that higher rates of hydrogen gas production occur as the reaction temperatures increase. However, it is believed that the rate of hydrogen generation is fairly constant even for decreasing concentrations of borohydride, and that the hydrogen generation rate will be fairly constant at a given temperature until the metal hydride concentration in solution is almost exhausted.

Note that according to eqn. (7) all of the hydrogen atoms present in borohydride and water are converted to hydrogen gas, and that half of the hydrogen atoms in the hydrogen gas produced by eqn. (7) comes from the water. As such, a theoretical hydrogen conversion ratio can be calculated from eqn. (7). For example, if lithium borohydride is used, the total weight of the reactants is 58 grams/mole: one mole of lithium borohydride weighs 22 grams, and two moles of water weighs 36 grams. Since 8 hydrogen atoms are produced, the theoretical hydrogen conversion ratio is 13.8% by weight of hydrogen. The maximum solubilities of various borohydrides are as follows: $NaBH_4$—about 35% by weight of the stabilized metal hydride solution; $LiBH_4$—about 7% by weight of the stabilized metal hydride solution; $KBH_4$—about 19% by weight of the stabilized metal hydride solution. Weight percentages in excess of the maximum solubilities for each listed borohydride will result in a slurry, i.e., a liquid mixture having insoluble components. As is well known in the art, mixing or stirring means are typically used to help dissolve the solid components of a slurry with additional water. For example, in the above calculation, 22 grams of lithium borohydride in 36 grams of water provides a 37.9% by weight solution of lithium borohydride. Since the 37.9% by weight solution of lithium borohydride exceeds its maximum solubility, this fuel mixture is a slurry.

Since two water molecules are consumed for each borohydride molecule, according to eqn. (7), the concentration of all the remaining components (i.e., the cation, the borate, and the borohydride) will increase as the reaction of eqn. (7) continues. Therefore, twice as many water molecules as borohydride molecules are needed to sustain a constant rate of reaction. In accordance with one or more embodiments of the present invention, this excess water can be provided in a number of ways: (a) charging the electrolyte with excess water, i.e., starting with a dilute solution, (b) adding water from a separate source during or after the reaction, and (c) adding water from an internal source during or after the reaction. Adding water from a separate source during or after the reaction may be useful when the hydrogen generator is utilized in conjunction with a hydrogen-consuming device (as used herein, a hydrogen-consuming device means a device that uses hydrogen as a fuel such as, for example and without limitation, a fuel cell, a combustion engine, a gas turbine, and so forth) because a main byproduct of hydrogen oxidation in a hydrogen-consuming device is water. In such a case, water output from the hydrogen-consuming device can be added to the electrolyte. Therefore, in accordance with one or more embodiments of the present invention, for example the embodiment shown in FIG. 7 and described in detail below, an adjacent mixing tank is used to add additional water through conduit 14, wherein the water may be obtained from an exhaust of the hydrogen consuming device. Adding water from an internal source during or after the reaction may be carried in accordance with the embodiment shown in FIG. 4 and described in detail below.

In accordance with one or more alternative embodiments of the present invention, the chemical reaction of eqn. (7) may also be driven by a potential between an anode material and a cathode material that is provided by a power source such as, for example and without limitation, a battery, a power supply, and so forth. In one or more such alternative embodiments, the anode material and the cathode material may be the same since the potential that drives the chemical reaction is provided by the external power source.

In accordance with one or more further embodiments of the present invention, a battery or a power supply may be electrically connected between the cathode material of container 200 of hydrogen generator 300 shown in FIG. 1 (using the negative terminal of the battery or power supply) and conduit 230 of hydrogen generator 300 shown in FIG. 1 (using the positive terminal of the battery or power supply). A switch, for example and without limitation, a solid state switch, a computer or microprocessor controlled switch, may also be utilized to make or break the electrical connection. In accordance with one or more such embodiments, when the battery or power supply is provided: (a) more hydrogen is generated when the anode and cathode material are such that they provide an oxidation-reduction potential; and (b) hydrogen is generated when the anode and cathode material are such that they do not provide an oxidation-reduction potential, for example, they are the same material. In accordance with one or more further alternative embodiments of the present invention, a capacitor can be connected in the circuit which electrically connects the anode material and the cathode material so that electrons produced by the hydrogen generator will charge the capacitor (because the capacitor will prevent electrons from flowing from the anode material to the cathode material, it is believed that this suppresses hydrogen production). Then, in accordance with one or more such further alternative embodiments of the present invention, a switch in the circuit electrically reverses the capacitor in accordance with any one of a number of methods that are well known to those of ordinary skill in the art so that the capacitor may discharge. It is believed that this discharge will enable hydrogen to be generated, and if the capacitor's discharge charge is in addition to an electrical connection between the anode material and the cathode material, it is believed that this will increase the hydrogen generation rate over that obtained with the electrical connection between the anode material and the cathode material alone. In further embodiments, the capacitor could apply a pulsing discharge to the hydrogen generator by being charged by a subsidiary pulse oscillator circuit in accordance with any one of a number of methods that are well known to those of ordinary skill in the art. In a still further alternative embodiment, a voltage regulator could be placed in the circuit to regulate the voltage to the generator to increase or decrease the voltage to the generator, to increase or decrease the hydrogen generator rate (and even to decrease it to zero by breaking the electrical connection between the anode material and the cathode material). In a still further alternative embodiment, semiconductor devices could be used to regulate hydrogen gas output, resistors could be used to limit hydrogen gas output, logic circuits could be used to regulate the voltage to the generator and its function of generating hydrogen. In light of the above, switch assembly 260 shown in FIG. 1A would include the battery, power supply, solid state switch, the capacitor circuit, the logic circuits to regulate the voltage to the generator, the microprocessor controlled switch, and so forth described above.

In accordance with one or more further embodiments of the present invention, since a current is created by one or more of the above-described exothermic reactions, the electrical energy that is created at the same time that the hydrogen is generated may also be beneficially used as well. For example, it may be used to recharge a battery.

As one or more specific examples, and in accordance with one or more such embodiments of the present invention, the anode material and the cathode material are dissimilar metals. For example, metals in order of increasing reactivity from cathodic to anodic include, for example and without limitation: platinum, gold, graphite, silver, stainless steel, inconel, nickel, monel, aluminum bronze, tin bronze, copper, brass, tin lead, lead tin solder, carbon steel, pure aluminum, cadmium, aluminum alloys, zinc, magnesium alloys, and magnesium. Using this information, one obtains that, for example, container 200 of hydrogen generator 300 shown in FIG. 1 may be fabricated using, for example and without limitation, stainless steel, nickel, monel, and so forth and, that in light of these choices, core 210 may be fabricated using, for example and without limitation, copper and aluminum. Also note that it is believed that the effect provided by the oxidation-reduction potential is enhanced as differences in reactivity of the metals increases, and further depends on the relative areas of the two metals. For example, it is believed that a smaller area of the anode material compared to a larger area of the cathode material suffers a more intense sacrificial reaction.

As one or more specific examples, and in accordance with one or more such embodiments of the present invention, the electrolyte is, for example and without limitation, salt water (for example, sea water); or a solution of sodium borohydride, sodium hydroxide (as a stabilizing agent), and water (and perhaps a gel such as sodium silicate or sodium metasilicate to act as a thickening agent in an amount in a range from about 0.001% to about 16% to help prevent sloshing). In accordance with one or more further embodiments of the present invention, an additive such as, for example and without limitation, ethylene glycol could be added to the electrolyte to prevent freezing. In accordance with one or more embodiments of the present invention, the viscosity of the electrolyte can be from water-like to grease- or tar-like, or any viscosity, i.e., the electrolyte may be in a liquid form or in a jelly form.

Figure 2:
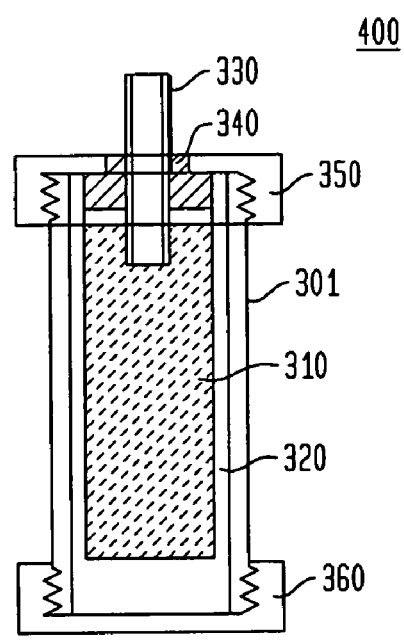
FIG. 2 shows a cross sectional view of a further hydrogen generator that is fabricated in accordance with one or more embodiments of the present invention.

FIG. 2 shows hydrogen generator 400 that is fabricated in accordance with one or more embodiments of the present invention. As shown in FIG. 2, container 301 is, for example and without limitation, a pipe. In accordance with one or more embodiments of the present invention, container 301 may be fabricated from a cathode material (embodied as was described in detail above) or it may be fabricated from a further material that is coated, plated, and so forth with the cathode material (which coating, plating, and so forth is disposed on the inside of container 301, i.e., facing region 320). In accordance with one or more such embodiments, the further material may be, for example and without limitation, a non-conductive plastic, a metal, a conductive plastic, a ceramic, stone, fiberglass, and so forth (as a specific example, container 301 could be steel which is chrome-plated on the inside). As further shown, container 301 includes a screw-top and an optional screw-bottom. Thus, in accordance with one or more embodiments of the present invention, container 301 may be fabricated as a structure that: (a) has at least an inner cathode material portion wherein an electrical connection can be made to the inner cathode material portion (for example and without limitation, by fabricating a container wherein the entire container is electrically conductive); and (b) can withstand the chemistry and pressure generated by the reaction therewithin (as described in detail above). In addition, and as one can readily appreciate, container 301 may be fabricated in any number of shapes and sizes.

As further shown in FIG. 2, hydrogen generator 400 includes core 310. In accordance with one or more embodiments of the present invention, core 310 is fabricated from an anode material (embodied as described in detail above). In addition, core 310 may fabricated in any one of a number of forms such as, for example and without limitation, a. porous anode material, a metal wool-like material, or plastic wool-like material coated with anode material, a plastic foam coated with anode material, a mesh of anode material, an anode material cloth, an "expanded" anode material, a woven anode material, a honeycomb sheet of anode material, a perforated sheet of anode material, a plastic plated with anode material, a sintered metal filter of anode material, a microporous sheet of anode material, a solid anode material, anode material in the form of beads, small balls, chunks, or wires enclosed in a filter mesh, and so forth (as a specific example, the anode material of core 310 could be, for example and without limitation, nickel).

As further shown in FIG. 2, hydrogen generator 400 includes region 320. In accordance with one or more embodiments of the present invention, at least a portion of region 320, as well as at least a portion of the region occupied by core 310, is filled with an electrolyte (embodied as described in detail above).

As further shown in FIG. 2, hydrogen generator 400 includes conduit 330 that provides a conduit for hydrogen gas generated therein to exit hydrogen generator 400. As further shown in FIG. 2, a portion of conduit 330 is surrounded by insulator 340, and insulator 340 is surrounded (optionally by pipe 301), and is held in place, by cap 350, for example and without limitation, using a screw connection to the top of container 301. In accordance with one or more embodiments of the present invention, conduit 330 is electrically conductive, and is electrically connected to core 310 using any one of a number of methods that are well known to those of ordinary skill in the art such as, for example and without limitation, by welding or by using any one of a number of mechanisms that are well known to those of ordinary skill in the art that promote electrical connectivity. As such, conduit 330 may be fabricated from any one of a number of materials such as, for example and without limitation, a metal, a conductive ceramic, a conductive plastic, and so forth. Insulator 340 prevents electrical connection between the cathode material of container 301 and core 310. In accordance with such embodiments of the present invention, insulator 340 may be fabricated from, for example and without limitation, plastic such as nylon, polyester, Teflon, polyethylene, and so forth. In addition, cap 350 may be fabricated from any one of a number of materials such as, for example and without limitation, a metal, a conductive ceramic, a metal plated ceramic, a conductive plastic, and so forth. Alternatively, cap 350 may be fabricated from an insulating material. In addition, cap 360 may be fabricated from any one of a number of materials such as, for example and without limitation, a metal, a conductive ceramic, an insulating material such as a non-conductive plastic, and so forth. Cap 360 may be affixed to container 301 using any one of a number of methods that are well known to those of ordinary skill in the art such as, for example and without limitation, by screwing or by welding it to container 301.

Lastly, control of hydrogen generation from hydrogen generator 400 may be provided by controlling electrical connection between the anode material and the cathode material using any of the embodiments described above with respect to hydrogen generator 300 shown in FIG. 1.

In accordance with one or more alternative embodiments of the present invention, a hydrogen generator like hydrogen generator 400 shown in FIG. 2 may be fabricated wherein container 301 is tube-like and is formed, for example and without limitation, in a curved shape such as an arc or an "S" to enable it to fit into predetermined shapes. Advantageously, such hydrogen generators could be held in place by mechanisms such as clamps. In accordance with one or more such alternative embodiments, container 301 may be comprised of, for example and without limitation, braided hose assemblies, tubing fabricated from plastic or metal, interlocking metal hose material, and so forth. In some such cases the containers are completely fabricated from cathode material, and in others of such cases the inside of the containers may be, for example and without limitation, coated or plated with cathode material.

FIG. 3 shows an exploded cross sectional view of hydrogen generator 500 that is fabricated in accordance with one or more embodiments of the present invention. As shown in FIG. 3, a container for hydrogen generator 500 comprises container portions $400_1$ and $400_2$. In accordance with one or more embodiments of the present invention, container portions $400_1$ and $400_2$ may be fabricated from a cathode material (embodied as was described in detail above) or they may be fabricated from a further material that is coated, plated, and so forth with the cathode material (which coating, plating, and so forth is disposed on the insides of container portions $400_1$ and $400_2$, i.e., facing regions $425_1$ and $425_2$, respectively). In accordance with one or more such embodiments, the further material may be, for example and without limitation, a non-conductive plastic, a metal, a conductive plastic, a ceramic, stone, fiberglass, and so forth (as a specific example, portions $400_1$ and $400_2$ could be steel which is chrome-plated on the inside). Thus, in accordance with one or more embodiments of the present invention, container 301 may be fabricated as a structure that: (a) has at least an inner cathode material portion wherein an electrical connection can be made to the inner cathode material portion (for example and without limitation, by fabricating a container wherein the entire container is electrically conductive); and (b) can withstand the chemistry and pressure generated by the reaction therewithin (as described in detail above). Container portions $400_1$ and $400_2$ may be joined to form the container by crimping, welding, or by affixing them using any one of a number of methods that are well known to those of ordinary skill in the art including, for example, and without limitation, by using screws. In addition, and as one can readily appreciate, the container formed from container portions $400_1$ and $400_2$ may be fabricated in any number of shapes and sizes.

As further shown in FIG. 3, hydrogen generator 500 includes core portions $410_1$ and $410_2$. In accordance with one or more embodiments of the present invention, core portions $410_1$ and $410_2$ are fabricated from an anode material (embodied as described in detail above). In addition, core portions $410_1$ and $410_2$ may fabricated in any one of a number of forms such as, for example and without limitation, a porous anode material, a metal wool-like material, or plastic wool-like material coated with anode material, a plastic foam coated with anode material, a mesh of anode material, an anode material cloth, an "expanded" anode material, a woven anode material, a honeycomb sheet of anode material, a perforated sheet of anode material, a plastic plated with anode material, a sintered metal filter of anode material, a microporous sheet of anode material, a solid anode material, anode material in the form of beads, small balls, chunks, or wires enclosed in a filter mesh, and so forth (as a specific example, the anode material of core portions $410_1$ and $410_2$ could be, for example and without limitation, nickel). As further shown in FIG. 3, screens $420_1$ and $420_2$ are disposed on either side of core portions $410_1$ and $410_2$, respectively, to insulate core portions $410_1$ and $410_2$ from making electrical contact with the container when hydrogen generator 500 is assembled. Screens $420_1$ and $420_2$ may be fabricated from any one of a number of insulating materials such as, for example and without limitation, non-conductive plastic. Additionally, core portions $410_1$ and $410_2$ may be encased in a porous frame that fits into the container to prevent electrical conduction between the anode material and the cathode material when hydrogen generator 500 is assembled. The frame may be fabricated from any one of a number of insulating materials such as, for example and without limitation, non-conductive plastic.

As further shown in FIG. 3, hydrogen generator 500 includes regions $425_1$ and $425_2$. In accordance with one or more embodiments of the present invention, at least a portion of regions $425_1$ and $425_2$, as well as at least a portion of the region occupied by core portions $410_1$ and $410_2$, are filled with an electrolyte (embodied as described in detail above).

As further shown in FIG. 3, hydrogen generator 500 includes conduit 430 that provides a conduit for hydrogen gas generated therein to exit hydrogen generator 500. As further shown in FIG. 3, a portion of conduit 430 is surrounded by insulator 440. In accordance with one or more embodiments of the present invention, conduit 430 is electrically conductive, and is electrically connected to core portions $410_1$ and $410_2$ using any one of a number of methods that are well known to those of ordinary skill in the art such as, for example and without limitation, by welding or by using any one of a number of mechanisms that are well known to those of ordinary skill in the art that promote electrical connectivity. As such, conduit 430 may be fabricated from any one of a number of materials such as, for example and without limitation, a metal, a conductive ceramic, a metal plated ceramic, a conductive plastic, and so forth. Insulator 440 prevents electrical connection between the cathode material of the container and core portions $410_1$ and $410_2$. In accordance with such embodiments of the present invention, insulator 440 may be fabricated from, for example and without limitation, plastic such as nylon, polyester, Teflon, polyethylene, and so forth.

As further shown in FIG. 3, conduit 430 is filled with hydrophobic filter 450, which hydrophobic filter may be fabricated utilizing any one of a number of filter materials that are well known to those of ordinary skill in the art such as, for example and without limitation, filters obtained from one or more of Whatman, Inc. of Clifton, N.J., Pall Corporation of East Hills, N.Y., Osmonics of Minnetonka, Minn., and Arbor Technologies, Inc. of Ann Arbor, Mich. Although hydrophobic filter 450 is shown to be disposed inside conduit 430, alternative embodiments exist wherein hydrophobic filter 450 may be disposed outside or even inside hydrogen generator 500 in a position so that the hydrogen gas generated passes therethrough. As a result, water is prevented or impeded, in flowing with or amongst the hydrogen gas. It should be noted that such a hydrophobic filter may be similarly used with any of the embodiments described herein.

Lastly, control of hydrogen generation from hydrogen generator 500 may be provided by controlling electrical connection between the anode material and the cathode material using any of the embodiments described above with respect to hydrogen generator 300 shown in FIG. 1.

Figure 5:
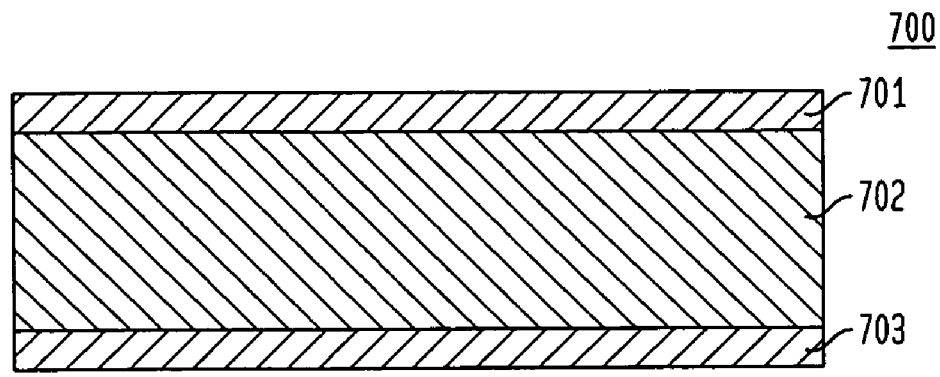
FIGS. 5-6 show water storage and release structures that may be utilized to fabricate one or more embodiments of the present invention.
Figure 6:
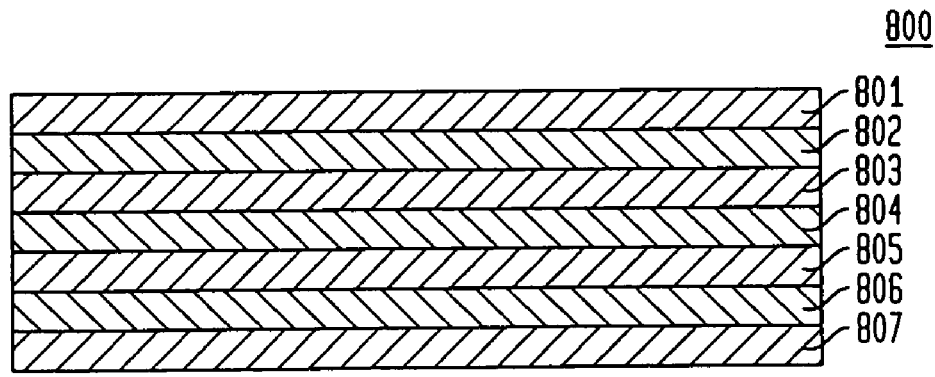

FIG. 4 shows an exploded cross sectional view of hydrogen generator 600 that is fabricated in accordance with one or more embodiments of the present invention. Hydrogen generator 600 is the same as hydrogen generator 500 shown in FIG. 3 with the addition of water storage and release structures $470_1$ and $470_2$. In accordance with one or more embodiments of the present invention, structures $470_1$ and $470_2$ are water containers that release water to make up for water utilized in generating hydrogen in the manner described above. FIGS. 5-6 show water storage and release structures 700 and 800 that may be utilized to fabricate one or more embodiments of the present invention. As shown in FIG. 5, water storage and release structure 700 comprises layers 701-703 wherein layers 701 and 703 may store water or electrolyte, and wherein layer 702 may store water or electrolyte. Layers 701-703 are comprised of materials that store the water and/or electrolyte, and then release them over time. In accordance with one or more embodiments of the present invention, layers 701-703 may be formed of a sponge such as, for example and without limitation, a cloth sponge, a metal sponge, a foamed rubber sponge, a plastic sponge, a natural sponge, and so forth. In accordance with one or more alternative embodiments of the present invention, layers 701-703 may be formed of paper, rope, cellulose, cotton, rayon, polypropylene, and woven belts. In accordance with one or more alternative embodiments of the present invention, layers 701-703 may be formed of filters such as hydrophobic or hydrophilic filters that release water in response to being heated by the above-described reactions which generate hydrogen. In accordance with one or more alternative embodiments of the present invention, layers 701-703 may be formed of any one of a number of membranes that are commercially available which allow water to slowly drip into the electrolyte. In accordance with one or more alternative embodiments of the present invention, layers 701-703 may be formed of masonry; porous ceramics; foams; gels; gelatin; membrane mucilage; Tragacanth gum; man-made membranes from companies such as, for example and without limitation, W. L. Gore & Associates, Inc. of Elkton, Md., Celgard, Inc. of Charlotte, N.C., and so forth; and so forth.

As shown in FIG. 6, water storage and release structure 800 comprises layers 801-807 wherein layers 801, 803, 805, and 807 may store water, and wherein layers 802, 804, and 806 may store electrolyte. Layers 801-807 are embodied utilizing the above-described materials that store water or electrolyte, and then release them over time.

In accordance with one or more further embodiments of the present invention, hydrogen generator 300 shown in FIG. 3, hydrogen generator 400 shown in FIG. 4, hydrogen generator 500 shown in FIG. 5, and hydrogen generator 600 shown in FIG. 6 may include a tube (not shown) that is used to transfer electrolyte into the hydrogen generators. Then, after the electrolyte has been transferred, the tubes may be removed, and the containers may be sealed using any one of a number of methods that are well known to those of ordinary skill in the art such as, for example and without limitation, a plastic plug. Alternatively, the electrolyte may be transferred into the container before the hydrogen generator is completely assembled.

Figure 7:
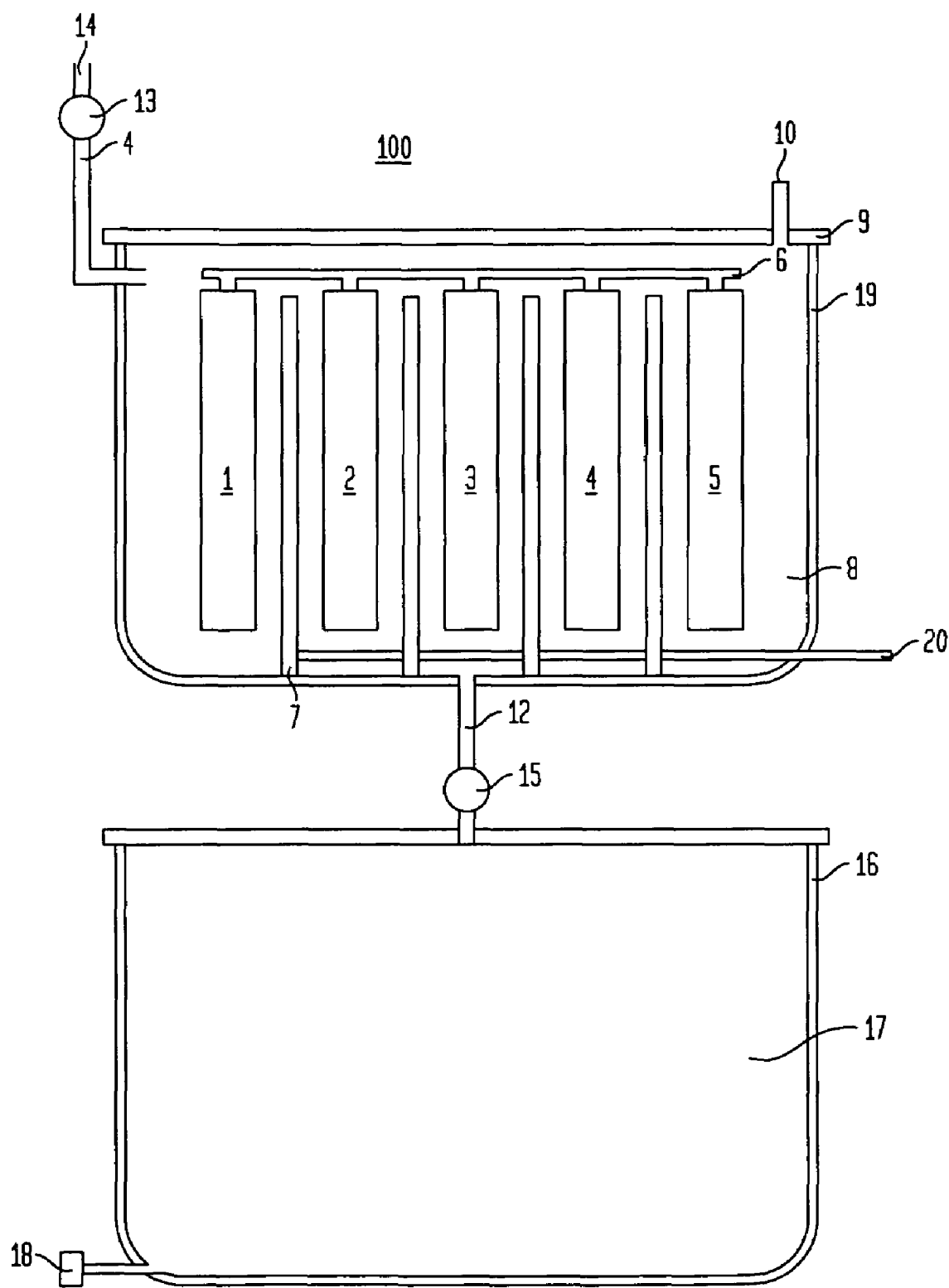
FIGS. 7-8 show cross sectional views of further hydrogen generators that are fabricated in accordance with one or more embodiments of the present invention.

FIG. 7 shows hydrogen generator 100 that is fabricated in accordance with one or more embodiments of the present invention. As shown in FIG. 7, hydrogen generator 100 comprises container 19. In accordance with one or more embodiments of the present invention, container 19 may be fabricated from a cathode material (embodied as was described in detail above), it may be fabricated from a further material that is coated, plated, and so forth with the cathode material (which coating, plating, and so forth is disposed on the insides of container 19), it may be fabricated from an electrical conductor, or it may be fabricated from an insulating material such as, for example and without limitation, an insulating plastic. In accordance with one or more such embodiments, the further material may be, for example and without limitation, a non-conductive plastic, a metal, a conductive plastic, a ceramic, stone, fiberglass, and so forth (as a specific example, container 19 could be steel which is chrome-plated on the inside). Thus, in accordance with one or more embodiments of the present invention, container 19 may be fabricated as a structure that: (a) has at least an inner cathode material portion wherein an electrical connection can be made to the inner cathode material portion (for example and without limitation, by fabricating a container wherein the entire container is electrically conductive); (b) can withstand the chemistry and pressure generated by the reaction therewithin (as described in detail above).

As further shown in FIG. 7, plates 7 are affixed to container 19 for support in accordance with any one of a number of methods that are well known to those of ordinary skill in the art. In accordance with one or more embodiments of the present invention, plates 7 may be fabricated from a cathode material (embodied as was described in detail above), or it may be fabricated from a further material that is coated, plated, and so forth with the cathode material. In accordance with one or more such embodiments, the further material may be, for example and without limitation, a non-conductive plastic, a metal, a conductive plastic, a ceramic, stone, fiberglass, and so forth (as a specific example, plates 7 could be monel, nickel, and stainless steel). Thus, in accordance with one or more embodiments of the present invention, plates 7 may be fabricated as structures that: (a) have at least an outer cathode material portion wherein an electrical connection can be made to the outer cathode material portion (for example and without limitation, by fabricating plates wherein the entire plates are electrically conductive); and (b) can withstand the chemistry and pressure generated by the reaction therewithin (as described in detail above). As further shown in FIG. 7, electrical conductor 20 electrically connects plates 7, and passes through container 19 to provide a mechanism for electrically connecting to plates 7. Electrical conductor 20 may be fabricated from materials such as, for example and without limitation, monel, nickel, and stainless steel as well as other materials that are not affected by electrolyte 8 (electrolyte 8 is embodied as described in detail above).

As further shown in FIG. 7, hydrogen generator 100 includes inner plates 1-5. Inner plates 1-5 are affixed to container 19 for support (not shown) so that there is no electrical connection therebetween in accordance with any one of a number of methods that are well known to those of ordinary skill in the art. In accordance with one or more embodiments of the present invention, inner plates 1-5 are fabricated from an anode material (embodied as described in detail above). In addition, inner plates 1-5 may fabricated in any one of a number of forms such as, for example and without limitation, a porous anode material, a metal wool-like material, or plastic wool-like material coated with anode material, a plastic foam coated with anode material, a mesh of anode material, an anode material cloth, an "expanded" anode material, a woven anode material, a honeycomb sheet of anode material, a perforated sheet of anode material, a plastic plated with anode material, a sintered metal filter of anode material, a microporous sheet of anode material, a solid anode material, anode material in the form of beads, small balls, chunks, or wires enclosed in a filter mesh, a further material that is coated, plated, and so forth with the anode material, and so forth. In accordance with one or more such embodiments, the further material may be, for example and without limitation, a non-conductive plastic, a metal, a conductive plastic, a ceramic, stone, fiberglass, and so forth (as a specific example, inner plates 1-5 could be aluminum, magnesium, or zinc). As further shown in FIG. 7, electrical conductor 6 electrically connects inner plates 1-5, and passes through container 19 (without electrically connecting to container 19) to provide a mechanism for electrically connecting to plates 6. Electrical conductor 6 may be fabricated from materials such as, for example and without limitation, copper as well as other materials that are not affected by electrolyte 8.

As further shown in FIG. 7, hydrogen generator includes lid 9. In accordance with one or more embodiments of the present invention, lid 9 is a removable lid for container 19 (lid 9 may be removed to provide access to remove and replace spent inner plates 1-5). As further shown in FIG. 7, (a) conduit 10 is an outlet for hydrogen gas; (b) conduit 14 is a conduit through which electrolyte 8 that is stored, for example and without limitation, in a tank (not shown) is pumped into container 19; (c) pump 13 pumps electrolyte 8 into container 19 through conduit 14; (d) conduit 12 is a drain for spent electrolyte 8; (e) pump 15 pumps spent electrolyte 8 from container 19; (f) container 16 is a storage tank for spent electrolyte 8 that has been pumped from container 19; and (g) valve 18 is a valve to enable electrolyte stored in container 16 to be drained therefrom. Pumps 13 and 15 may be any one of a number of commercially available pumps that are well known to those of ordinary skill in the art.

Lastly, control of hydrogen generation from hydrogen generator 100 may be provided by controlling electrical connection between conductors 6 and 20 using any of the embodiments described above with respect to hydrogen generator 300 shown in FIG. 1.

In accordance with one or more embodiments of the present invention, hydrogen generation in hydrogen generator 100 is stopped by removing electrolyte 8 from container 19 or by removing inner plates 1-5 from container 19. In accordance with one or more such embodiments, a hinge arrangement that is retracted using any one of a number of mechanisms (not shown) that are well known to those of ordinary skill in the are such as, for example and without limitation, a solenoid that is powered, for example and without limitation, by a battery or an external power supply; a gas cylinder that uses, for example and without limitation, hydrogen gas produced by hydrogen generator; a motor, and so forth. In accordance with one or more such embodiments, the solenoid or the motor could be powered by energy generated by the voltaic generator reaction.

Figure 8:
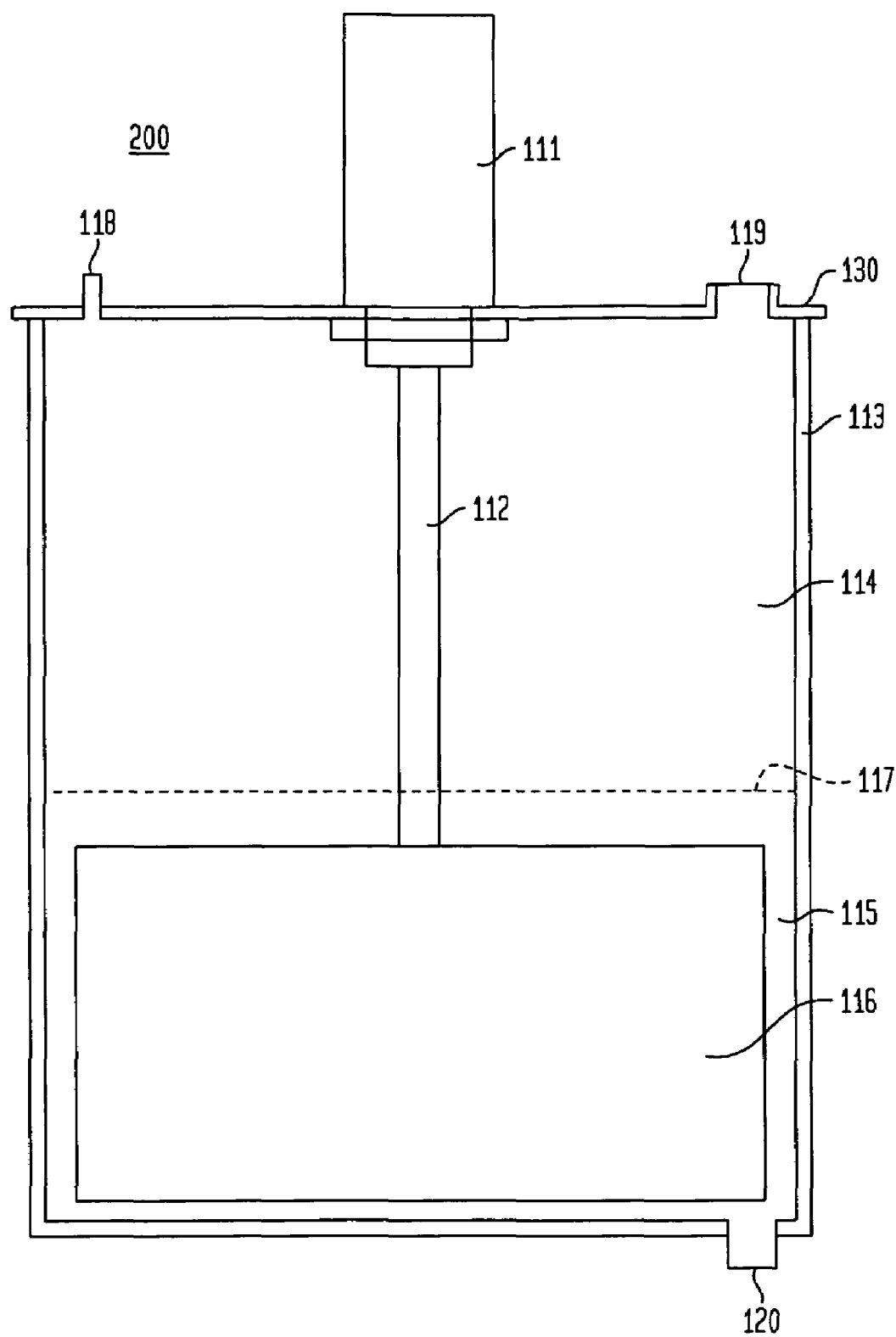

FIG. 8 shows hydrogen generator 200 that is fabricated in accordance with one or more embodiments of the present invention. As shown in FIG. 8, hydrogen generator 200 includes container 113. In accordance with one or more embodiments of the present invention, container 113 is like container 19 described above in conjunction with hydrogen generator 100 and shown in FIG. 7. In addition, hydrogen generator 200 includes a set of electrically connected plates (not shown) like plates 7 described above in conjunction with hydrogen generator 100 and shown in FIG. 7.

As further shown in FIG. 8, hydrogen generator 200 includes plate set 116. In accordance with one or more embodiments of the present invention, plate set 116 includes a multiplicity of electrically connected plates that are fabricated from an anode material (embodied as described in detail above). In addition, the plates may fabricated in any one of a number of forms such as, for example and without limitation, a porous anode material, a metal wool-like material, or plastic wool-like material coated with anode material, a plastic foam coated with anode material, a mesh of anode material, an anode material cloth, an "expanded" anode material, a woven anode material, a honeycomb sheet of anode material, a perforated sheet of anode material, a plastic plated with anode material, a sintered metal filter of anode material, a microporous sheet of anode material, a solid anode material, anode material in the form of beads, small balls, chunks, or wires enclosed in a filter mesh, a further material that is coated, plated, and so forth with the anode material, and so forth. In accordance with one or more such embodiments, the further material may be, for example and without limitation, a non-conductive plastic, a metal, a conductive plastic, a ceramic, stone, fiberglass, and so forth (as a specific example, the plates could be aluminum, magnesium, or zinc).

As further shown in FIG. 8, (a) conduit 118 is an outlet for hydrogen gas generated in container 113; (b) conduit 119 is conduit through which electrolyte is transmitted to refill container 113; (c) conduit 120 is a drain for spent electrolyte; and (d) lid 130 is a removable lid for container 113 that is removed to provide access to remove and replace spent plates from plate set 116.

Dotted line 117 shown in FIG. 8 indicates a top level of electrolyte 115 (electrolyte 115 is embodied as described in detail above) in container 113, and region 114 of container 113 provides a region into which plate set 116 may be moved so that it is not in contact with electrolyte 115.

Anode movement mechanism 111 is an apparatus that raises or lowers plate set 116 (attached to plunger rod 112) out of, or into, respectively, electrolyte 115, thereby stopping or starting, respectively, hydrogen generation. In accordance with one or more such embodiments of the present invention, anode movement mechanism 111 may be fabricated utilizing, for example and without limitation, a motor, solenoid plunger, an air cylinder, a plunger rod, a rotary motor screw, solenoid plunger, and so forth.

In accordance with one or more further embodiments of the present invention, conduits that enable hydrogen to exit a hydrogen generator that is fabricated in accordance with any one or more embodiments of the present invention may be fabricated in any one of a number of shapes. For example and without limitation, the conduits may have an arced shape inside the container. In addition, and in accordance with one or more such embodiments of the present invention, the conduit may have a multiplicity of holes therein which are disposed, for example and without limitation, inside the container. Advantageously, such holes may provide multiple access by hydrogen gas to the conduit to better enable the hydrogen gas to exit the hydrogen generator. In further addition, an end of the conduit inside the container may have an expanded opening (such as, for example and without limitation, an opening in the shape of a funnel), which expanded opening may better enable hydrogen gas to exit the hydrogen generator. In accordance with one or more further embodiments of the present invention, filter membranes that only pass hydrogen may be disposed around and/or inside the conduit. Advantageously, such filter membranes may act to prevent electrolyte or reaction byproducts from exiting through the conduit if the hydrogen generator is jostled or turned upside down. Such filter membranes are well known to those of ordinary skill in the art and may be obtained from companies such as, for example and without limitation, W. L. Gore & Associates, Inc. of Elkton, Md., Celgard, Inc. of Charlotte, N.C., and so forth.

Although various embodiments that incorporate the teachings of the present invention have been shown and described in detail herein, those skilled in the art can readily devise many other varied embodiments that still incorporate these teachings.

What is claimed is:

1. A hydrogen generator that comprises:
    an anode material;
    a cathode material; and
    an electrolyte;
    wherein the hydrogen generator does not include a catalyst;
    wherein the electrolyte comprises a metal hydride, at least one stabilizing agent, and a solvent; and
    wherein the metal hydride is stabilized so that hydrogen gas is not generated unless the anode material and the cathode material are electrically connected; and
    wherein the metal hydride includes one or more of $NaBH_4$ (sodium borohydride), $LiBH_4$ (lithium borohydride), $KBH_4$ (potassium borohydride), $NH_4BH_4$ (ammonium borohydride), $(CH_3)_4NH_4BH_4$ (tetramethyl ammonium borohydride), $NaAlH_4$, $LiAlH_4$, $KAlH_4$, $NaGaH_4$, $LiGaH_4$, $KGaH_4$, or quaternary borohydrides.

2. The hydrogen generator of claim 1 wherein the at least one stabilizing agent includes a corresponding hydroxide of a cation part of the metal hydride.

3. The hydrogen generator of claim 2 wherein the hydroxide includes one or more of sodium hydroxide, lithium hydroxide, or potassium hydroxide.

4. The hydrogen generator of claim 1 wherein the solvent is water.

5. The hydrogen generator of claim 1 wherein the anode material is a metal selected from lanthanide metals or actinide metals.

6. The hydrogen generator of claim 1 wherein the anode material is a metal selected from one or more of magnesium, aluminum, zinc, beryllium, titanium, vanadium, chromium, silicon, iron, nickel, or zirconium.

7. A hydrogen generator that comprises:
    an anode material;
    a cathode material;
    a switchable electrical connection between the anode material and the cathode material;
    a conduit through which hydrogen gas exits the hydrogen generator; and
    an electrolyte that contacts the anode material and the cathode material;
    wherein the hydrogen generator does not include a catalyst;
    wherein the electrolyte comprises a metal hydride, at least one stabilizing agent, and a solvent;
    wherein the metal hydride is a complex metal hydride having a general chemical formula $MBH_4$;
    wherein M is an alkali metal selected from Group 1 of the periodic table; B is an element selected from Group 13 of the periodic table; and H is hydrogen;
    wherein the metal hydride is stabilized so that hydrogen gas is not generated unless the anode material and the cathode material are electrically connected; and
    wherein a potential is generated between the anode material and the cathode material when they are connected.

8. The hydrogen generator of claim 7 wherein the anode material is selected from the following materials platinum, gold, graphite, silver, stainless steel, inconel, nickel, monel, aluminum bronze, tin bronze, copper, brass, tin lead, lead tin solder, carbon steel, pure aluminum, cadmium, aluminum alloys, zinc, magnesium alloys, or magnesium and the cathode material is also selected from these materials but it is more cathodic than the anode material.

9. The hydrogen generator of claim 7 wherein the anode material and the cathode material are dissimilar materials.

10. The hydrogen generator of claim 1 wherein the electrolyte further comprises a gel.

11. The hydrogen generator of claim 1 which further includes a conduit through which hydrogen gas exits the hydrogen generator.

12. The hydrogen generator of claim 1 which comprises a container wherein:
    the container comprises container portions fabricated from the cathode material or fabricated from a further material that is coated or plated on the insides of the container portions with the cathode material; and
    wherein the container further includes core portions fabricated from the anode material that is electrically insulated from the cathode material and is in the form of one or more of a porous anode material, a metal wool-like anode material, a plastic wool-like material coated with anode material, a plastic foam coated with anode material, a mesh of anode material, an anode material cloth, a woven anode material, a honeycomb sheet of anode material, a perforated sheet of anode material, a plastic plated with anode material, a sintered metal filter of anode material, a microporous sheet of anode material, a solid anode material, and anode material in the form of beads, small balls, chunks, or wires enclosed in a filter mesh.

13. The hydrogen generator of claim 11 wherein the conduit is electrically connected to the anode material.

14. The hydrogen generator of claim 13 wherein the conduit is disposed in a cap of the container, which cap is electrically insulated from the container by an insulator.

15. The hydrogen generator of claim 14 wherein a hydrophobic filter is disposed in the conduit.

16. The hydrogen generator of claim 13 wherein the cathode material forms a container, the electrolyte comprises water and the container further comprises a source of water.

17. The hydrogen generator of claim 13 wherein the cathode material forms a container, and an electrical connection is made between the anode material and the cathode material by a switchable electrical connection between the conduit and the container.

18. The hydrogen container of claim 17 wherein the electrical connection between the conduit and the container further comprises a switch.

19. The hydrogen generator of claim 2 wherein an hydroxide concentration in a stabilized metal hydride solution is greater than about 0.1 molar.

20. The hydrogen generator of claim 1 wherein the at least one stabilizing agent includes a corresponding hydroxide of a cation part of the metal hydride and one or more of a lead containing compound, a tin containing compound, a cadmium containing compound, a zinc containing compound, a gallium containing compound, and a mercury containing compound.

21. The hydrogen generator of claim 1 wherein the at least one stabilizing agent includes one or more sulfur containing compounds.

22. The hydrogen generator of claim 10 wherein the gel is sodium silicate or sodium metasilicate.

23. The hydrogen generator of claim 1 wherein the electrolyte further comprises ethylene glycol.

24. The hydrogen generator of claim 1 wherein the electrolyte is in a form of a liquid, a jelly, or a slurry.

25. The hydrogen generator of claim 12 wherein the container is a pipe.

26. The hydrogen generator of claim 13 wherein the conduit is electrically conductive.

27. The hydrogen generator of claim 14 wherein the cap is electrically conductive.

28. The hydrogen generator of claim 27 wherein the insulator is formed of one or more of a plastic, nylon, polyester, Teflon, and polyethylene; and wherein the cap is formed of one or more of a metal, a conductive ceramic, and a conductive plastic.

29. The hydrogen container of claim 17 wherein the electrical connection between the conduit and the container comprises a circuit that includes a pressure sensor that senses the pressure of hydrogen gas and makes or breaks the electrical connection depending on predetermined values of hydrogen pressure.

30. The hydrogen container of claim 29 wherein the hydrogen pressure may be that of hydrogen that exits in a conduit or it may the hydrogen pressure of hydrogen in a tank in which the hydrogen gas is stored.

31. The hydrogen generator of claim 1 further comprising:
   a switchable electrical connection between the anode material and the cathode material;
   wherein the electrical connection includes a power source.

32. The hydrogen generator of claim 31 wherein the power source is a battery or a power supply.

33. The hydrogen generator of claim 31 wherein the switchable electrical connection further includes an SCR device.

34. The hydrogen generator of claim 31 wherein the switchable electrical connection further includes a microprocessor controlled switch.

35. The hydrogen generator of claim 31 wherein the switchable electrical connection further includes a dischargeable capacitor.

36. The hydrogen generator of claim 1 further comprising:
   a switchable electrical connection between the anode material and the cathode material; and a voltage regulator and a voltage generator;
   wherein the regulator regulates the voltage to increase or decrease the voltage to the generator to increase or decrease a rate of hydrogen generation.

37. The hydrogen generator of claim 12 which further includes screens disposed on either side of the core portions.

38. The hydrogen generator of claim 12 wherein the core portions are encased in a porous frame that fits into the container.

39. The hydrogen generator of claim 12 which further comprises electrically conductive conduit that is electrically connected to the core portions.

40. The hydrogen generator of claim 11 which further includes a hydrophobic filter disposed with respect to the conduit so that hydrogen gas generated passes therethrough.

* * * * *